US008184559B2

(12) United States Patent
Nagai

(10) Patent No.: US 8,184,559 B2
(45) Date of Patent: May 22, 2012

(54) KEY TELEPHONE SYSTEM USING A SIP AND METHOD OF RECEIVING AND ANSWERING AN INCOMING CALL FOR A REPRESENTATIVE GROUP IN THE KEY TELEPHONE SYSTEM

(75) Inventor: Kazuki Nagai, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 1224 days.

(21) Appl. No.: 11/819,660

(22) Filed: Jun. 28, 2007

(65) Prior Publication Data

US 2008/0002671 A1 Jan. 3, 2008

(30) Foreign Application Priority Data

Jun. 30, 2006 (JP) ................................. 2006-181663

(51) Int. Cl.
*H04L 12/66* (2006.01)
(52) U.S. Cl. ...................... 370/260; 370/352; 370/384
(58) Field of Classification Search .................. None
See application file for complete search history.

(56) References Cited

U.S. PATENT DOCUMENTS

| 2004/0133641 A1* | 7/2004 | McKinnon et al. ........... 709/204 |
| 2005/0129003 A1* | 6/2005 | Baeder et al. ................ 370/352 |
| 2006/0212511 A1* | 9/2006 | Garcia-Martin .............. 709/203 |

FOREIGN PATENT DOCUMENTS

| EP | 1435722 | 7/2004 |
| JP | 3-74996 | 3/1991 |
| JP | 2000-209230 | 7/2000 |
| JP | 2002-152224 | 5/2002 |
| JP | 2004-228977 | 8/2004 |
| JP | 2004-235778 | 8/2004 |
| JP | 2004-242090 | 8/2004 |
| JP | 2004-363790 | 12/2004 |
| JP | 2005-110099 | 4/2005 |
| JP | 2005-136564 | 5/2005 |
| JP | 2005-236670 | 9/2005 |
| JP | 2005-244490 | 9/2005 |
| JP | 2005-252995 | 9/2005 |
| JP | 2005236670 A * | 9/2005 |

OTHER PUBLICATIONS

Japanese Office Action dated Sep. 7, 2011 in corresponding Japanese Application No. 2006-181663 with English translation of the relevant part of Japanese Office Action.
Japanese Official Action issued by the Japanese Patent Office on Jan. 11, 2012 in corresponding Japanese Patent Application No. 2006-181663, and English translation of the relevant portion, 3 pages.

* cited by examiner

*Primary Examiner* — Chirag Shah
*Assistant Examiner* — Jenkey Van
(74) *Attorney, Agent, or Firm* — Young & Thompson

(57) ABSTRACT

In a key telephone system including SIP telephones forming a representative group, a main unit transmits, upon reception of an incoming call for the representative group, a "NOTIFY" message to all of SIP telephones forming the representative group to perform a calling operation. An answering SIP telephone answers the main unit by sending a "NOTIFY" message to the main unit. The main unit transmits a "200 OK" message to the answering telephone alone and transmits a "NOTIFY" message to an unanswering SIP telephone.

16 Claims, 4 Drawing Sheets

KEY TELEPHONE SYSTEM USING A SIP AND METHOD OF RECEIVING AND ANSWERING AN INCOMING CALL FOR A REPRESENTATIVE GROUP IN THE KEY TELEPHONE SYSTEM

This application claims priority to prior Japanese patent application JP 2006-181663, the disclosure of which is incorporated herein by reference.

BACKGROUND OF THE INVENTION

This invention relates to a key telephone system using a SIP (Session Initiation Protocol) and, in particular, to a method of receiving and answering an incoming call for a representative group in the key telephone system.

As well known in the art, a key telephone system comprises a main unit connected to at least one station line (or at least one external telephone line) and a plurality of key telephones each of which is connected to the main unit via a communication line and a data line (for example, see Japanese Unexamined Patent Application Publication (JP-A) No. H3-74996 (Patent Document 1)).

In recent years, the key telephone system is developed so as to support or integrate VoIP (Voice over Internet Protocol). Herein, VoIP is a technique of transferring voice data on IP (Internet Protocol) which originally is a protocol for data communication, and is intended to achieve Internet telephony. As a typical call control protocol of VoIP, attention is focused upon SIP (Session Initiation Protocol).

Herein, SIP is an application layer signaling protocol for starting, modifying, and terminating one-to-one communication or collaborative communication among a plurality of participants, such as telephony and instant messenger, and is defined by RFC (request for comments) 3261. The signaling protocol covers, in case of telephony, a part of calling a called party and a part of being called by a calling party and controls the start to the end of communication.

In the present specification, a key telephone having a SIP function (i.e., a telephone supporting SIP) is called a "SIP telephone".

In a functional aspect, an existing key telephone system accommodating an existing key telephone (multifunctional telephone) provides various functional services and is enriched. In order to promote integration of VoIP into the key telephone system, the functional services provided by the existing key telephone system must be achieved also by a key telephone system using the SIP telephone.

SIP defines basic sequences such as call origination, call reception, call hold, and call transfer. However, SIP does not define any sequence for achieving the services provided by the existing key telephone system.

Proposal has already been made of the key telephone system using SIP. For example, a "telephone communication system" is known which has a simple structure and yet is capable of efficiently executing mutual transmission of telephone information between terminals and of highly flexibly adapting to increase or decrease in number of accommodated terminals (for example, see Japanese Unexamined Patent Application Publication (JP-A) No. 2002-152224 (Patent Document 2)).

More specifically, Patent Document 2 describes, as an example of a telephone communication system, a key telephone system installed in every home. In order to realize voice packet communication, for example, on an IP (Internet Protocol) network, use is made of SIP (RFC2543), SDP (RFC2327), and RTP (RFC1889)/RTCP (RFC1890) as a voice over IP control scheme. SIP (Session Initiation Protocol) is a protocol defined to control initiation, termination, and modification of a session of interactive communication. By placing an incoming call management server for managing "incoming call information" on the IP network, call receiving functions provided by the existing key telephone system, such as ordinary call reception, proxy response, and group call reception can be realized as an IP key telephone system.

In Patent Document 2, in order to provide services equivalent to those in the existing key telephone system by the use of terminals connected to the IP network and to improve system expandability, use is made of distributed arrangement of four functional blocks including an IP telephone, a SIP server, a resource management server, and an application server. Herein, a combination of the SIP server, the resource management server, and the application server corresponds to a main unit of a key telephone system.

The IP telephone is a LAN terminal compliant with IEEE802.3 and has a SIP user agent function. The SIP server is a LAN terminal compliant with IEEE802.3 and has a SIP server function. The resource management server is a LAN terminal compliant with IEEE802.3 and has a server function of managing, storing, and delivering a terminal status database of terminals belonging to the IP key telephone system. The application server is a LAN terminal compliant with IEEE802.3 and has a server function of providing a call reception service function of the IP key telephone system.

Patent Document 2 discloses, as a call answering sequence, a step of issuing a "Notify: BUSY" message to the resource management server when a call-receiving or called IP terminal during call reception performs a call answering operation such as a handset lifting operation. Further, Patent Document 1 discloses, as a call proxy response sequence, a step of notifying a session initiation request message (INVITE) defined by RFC2543 from a call management server to a proxy response terminal upon performing a call proxy response.

A "group telephone system" is known which enables a non-ringing group phone terminal to answer an incoming call to a shared number by picking even if the shared number is not known (for example, see Japanese Unexamined Patent Application Publication (JP-A) No. 2005-110099 (Patent Document 3)). In Patent Document 3, in order to answer the incoming call from a non-ringing telephone outside a shared number group, a primary number of a ringing telephone is inputted first and then a pickup key is pressed to perform a pickup operation. In response, the ringing telephone transmits a "NOTIFY" message to the non-ringing telephone. Then, the non-ringing telephone transmits an "INVITE" message for requesting an external line to change connection of the incoming call.

Further, proposal is made of "Transfer Method and Transfer Program in a SIP Terminal" which are capable of executing and terminating normal transaction by a transferring operation in a call reception limited condition (for example, see Japanese Unexamined Patent Application Publication (JP-A) No. 2005-136564 (Patent Document 4)). In Patent Document 4, a "NOTIFY" message is transmitted in order to notify a status.

Proposal is also made of an "IP Telephone Gateway Apparatus" in which, in case where a plurality of external telephone numbers are acquired and a plurality of telephones are provided, it is possible to divide the telephones into a plurality of call number groups so as to specify which telephones should receive an incoming call addressed to a particular one of the external telephone numbers without delivering an extra or additional packet to an IP network (see Japanese Unexamined Patent Application Publication (JP-A) No. 2005-244490 (Patent Document 5)). According to Patent Document 5, it is possible to switch sequential call reception and simultaneous call reception. In the sequential call reception, call reception requests are sequentially sent to the telephones in a predetermined order. In the simultaneous call reception, call reception requests are simultaneously sent to all of the telephones. Patent Document 5 discloses that, in case where the simultaneous call reception is carried out, an IP telephone gateway device of a called party simultaneously sends ringing requests to a plurality of available telephones and that, if hook-off of any telephone is detected, the IP telephone gateway device of the called party stops ringing of other telephones (unanswering telephones).

In the meanwhile, as one of call reception service functions provided by the existing key telephone system, a representative group call reception service function is known. Herein, the representative group call reception service function is a call reception service function in which a main unit detects a call to a number assigned to a representative group of SIP telephones and then simultaneously calls all of the SIP telephones forming the representative group.

Patent Document 2 may disclose several call reception service functions in the key telephone system using SIP. However, Patent Document 2 neither discloses nor suggests the representative group call reception service function. Thus, Patent Document 2 discloses, among various call reception service functions, no more than an ordinary call reception service function (call answering sequence) and a proxy response call reception service function (call proxy response sequence). No disclosure is made of the representative group call reception service function (group call response sequence).

Patent Document 3 discloses an example of use of a "NOTIFY" message. However, Patent Document 3 only discloses a conventional example of call pickup and neither discloses nor suggests the representative group call reception service function.

Patent Document 4 merely discloses the use of a "NOTIFY" message in case of a transfer service but neither discloses nor suggests the representative group call reception service function.

On the other hand, Patent Document 5 may disclose simultaneous call reception and call answering thereto. However, Patent Document 5 does not disclose specific examples about how to request simultaneous ringing and how to stop ringing of other telephones.

SUMMARY OF THE INVENTION

It is therefore an object of this invention to provide a method which is for use in a key telephone system using a session initiation protocol (SIP) and which perform, when an incoming call for a representative group is received, simultaneous call reception at SIP telephones forming the representative group and call answering.

Methods according to this invention, key telephone systems according to this invention, main units according to this invention, and programs according to this invention are as follows:

(1) A method of receiving and answering an incoming call for a representative group in a key telephone system using a session initiation protocol (SIP), the key telephone system comprising a main unit, a plurality of SIP telephones connected to the main unit via a LAN line, and a SIP server connected to the main unit via the LAN line, at least two of the SIP telephones forming the representative group, wherein the method comprising:

a first transmitting step at which the main unit transmits, upon reception of the incoming call for the representative group, a first predetermined message to all of the SIP telephones forming the representative group to perform a calling operation;

a second transmitting step at which a particular one of the SIP telephones, which answers the calling operation as an answering SIP telephone, transmits a second predetermined message to the main unit to notify the main unit that the calling operation is answered;

a third transmitting step at which the main unit transmits a third predetermined message to the answering SIP telephone alone to establish a call session with a calling telephone; and a fourth transmitting step at which the main unit transmits a fourth predetermined message to an unanswering SIP telephone to notify that the incoming call for the representative group has been answered.

(2) The method as described in the above-mentioned (1), further comprising a notifying step at which each of the SIP telephones, which have received the first predetermined message, notifies reception of the incoming call to a user.

(3) The method as described in the above-mentioned (2), further comprising a suspending step in which the unanswering SIP telephone, which has received the fourth predetermined message, suspends a call receiving operation to stop notifying the reception of the incoming call to the user.

(4) The method as described in the above-mentioned (1), wherein the first predetermined message is selected from a group consisting of a "NOTIFY" message for event notification, a "MESSAGE" message for event notification, and an "INFO" message for event notification.

(5) The method as described in the above-mentioned (1), wherein the second predetermined message is a "NOTIFY" message.

(6) The method as described in the above-mentioned (1), wherein the third predetermined message is an "INVITE" message for requesting session establishment.

(7) The method as described in the above-mentioned (1), wherein the fourth predetermined message is a "NOTIFY" message.

(8) A key telephone system using a session initiation protocol (SIP), the key telephone system comprising a main unit, a plurality of SIP telephones connected to the main unit via a LAN line, and a SIP server connected to the main unit via the LAN line, at least two of the SIP telephones forming a representative group, wherein:

the main unit comprises first transmitting means for transmitting, upon reception of an incoming call for the representative group, a first predetermined message to all of the SIP telephones forming the representative group to perform a calling operation;

a particular one of the SIP telephones, which answers the calling operation as an answering SIP telephone, comprising second transmitting means for transmitting a second predetermined message to the main unit to notify the main unit that the calling operation is answered;

the main unit comprising third transmitting means for transmitting a third predetermined message to the answering SIP telephone alone to establish a call session with a calling telephone and fourth transmitting means for transmitting a fourth predetermined message to an unanswering SIP telephone to notify that the incoming call for the representative group has been answered.

(9) The key telephone system as described in the above-mentioned (8), wherein each of the SIP telephones, which have received the first predetermined message, comprises notifying means for notifying reception of the incoming call to a user.

(10) The key telephone system as described in the above-mentioned (9), wherein the unanswering SIP telephone, which has received the fourth predetermined message, comprises suspending means for suspending a call receiving operation to stop notifying the reception of the incoming call to the user.

(11) The key telephone system as described in the above-mentioned (8), wherein the first predetermined message is selected from a group consisting of a "NOTIFY" message for event notification, a "MESSAGE" message for event notification, and an "INFO" message for event notification.

(12) The key telephone system as described in the above-mentioned (8), wherein the second predetermined message is a "NOTIFY" message.

(13) The key telephone system as described in the above-mentioned (8), wherein the third predetermined message is an "INVITE" message for requesting session establishment.

(14) The key telephone system as described in the above-mentioned (8), wherein the fourth predetermined message is a "NOTIFY" message.

(15) A main unit for use in a key telephone system using a session initiation protocol (SIP), the key telephone system comprising the main unit, a plurality of SIP telephones connected to the main unit via a LAN line, and a SIP server connected to the main unit via the LAN line, at least two of the SIP telephones forming a representative group, wherein the main unit comprises:

transmitting means for transmitting, upon reception of an incoming call for the representative group, a first predetermined message to all of the SIP telephones forming the representative group to perform a calling operation;

receiving means for receiving, from a particular one of the SIP telephones which answers the calling operation as an answering SIP telephone, a second predetermined message for notifying the main unit that the calling operation is answered;

transmitting means for transmitting a third predetermined message to the answering SIP telephone alone to establish a call session with a calling telephone; and transmitting means for transmitting a fourth predetermined message to an unanswering SIP telephone to notify that the incoming call for the representative group has been answered.

(16) The main unit as described in the above-mentioned (15), wherein the first predetermined message is selected from a group consisting of a "NOTIFY" message for event notification, a "MESSAGE" message for event notification, and an "INFO" message for event notification.

(17) The main unit as described in the above-mentioned (15), wherein the second predetermined message is a "NOTIFY" message.

(18) The main unit as described in the above-mentioned (15), wherein the third predetermined message is an "INVITE" message for requesting session establishment.

(19) The main unit as described in the above-mentioned (15), wherein the fourth predetermined message is a "NOTIFY" message.

(20) A program for use in a main unit of a key telephone system using a session initiation protocol (SIP), the key telephone system comprising the main unit, a plurality of SIP telephones connected to the main unit via a LAN line, and a SIP server connected to the main unit via the LAN line, at least two of the SIP telephones forming a representative group, wherein the program makes the main unit function as:

means for transmitting, upon reception of an incoming call for the representative group, a first predetermined message to all of the SIP telephones forming the representative group to perform a calling operation;

means for receiving, from a particular one of the SIP telephones which answers the calling operation as an answering SIP telephone, a second predetermined message for notifying the main unit that the calling operation is answered;

means for transmitting a third predetermined message to the answering SIP telephone alone to establish a call session with a calling telephone; and means for transmitting a fourth predetermined message to an unanswering SIP telephone to notify that the incoming call for the representative group has been answered.

(21) The program as described in the above-mentioned (20), wherein the first predetermined message is selected from a group consisting of a "NOTIFY" message for event notification, a "MESSAGE" message for event notification, and an "INFO" message for event notification.

(22) The program as described in the above-mentioned (20), wherein the second predetermined message is a "NOTIFY" message.

(23) The program as described in the above-mentioned (20), wherein the third predetermined message is an "INVITE" message for requesting session establishment.

(24) The program as described in the above-mentioned (20), wherein the fourth predetermined message is a "NOTIFY" message.

In this invention, when an incoming call addressed to a representative group is detected, a main unit calls all SIP telephones forming the representative group by sending a first predetermined message. A particular SIP telephone as an answering SIP telephone answers the main unit by sending a second predetermined message. The main unit transmits a third predetermined message only to the answering SIP telephone and transmits a fourth predetermined message to an unanswering SIP telephone. Thus, upon reception of the incoming call for the representative group, it is possible to perform simultaneous call reception at the SIP telephones forming the representative group and to answer the incoming call.

As the first predetermined message, an "INVITE" message is not used but one of a "NOTIFY" message for event notification, a "MESSAGE" message for event notification, and an "INFO" message for event notification is used. Thus, upon occurrence of a plurality of incoming calls for the representative group, it is unnecessary to administrate a plurality of dialogs (calls) by receiving a plurality of "INVITE" messages.

DESCRIPTION OF THE PREFERRED EMBODIMENT

Now, an embodiment of this invention will be described in detail.

Figure 1:
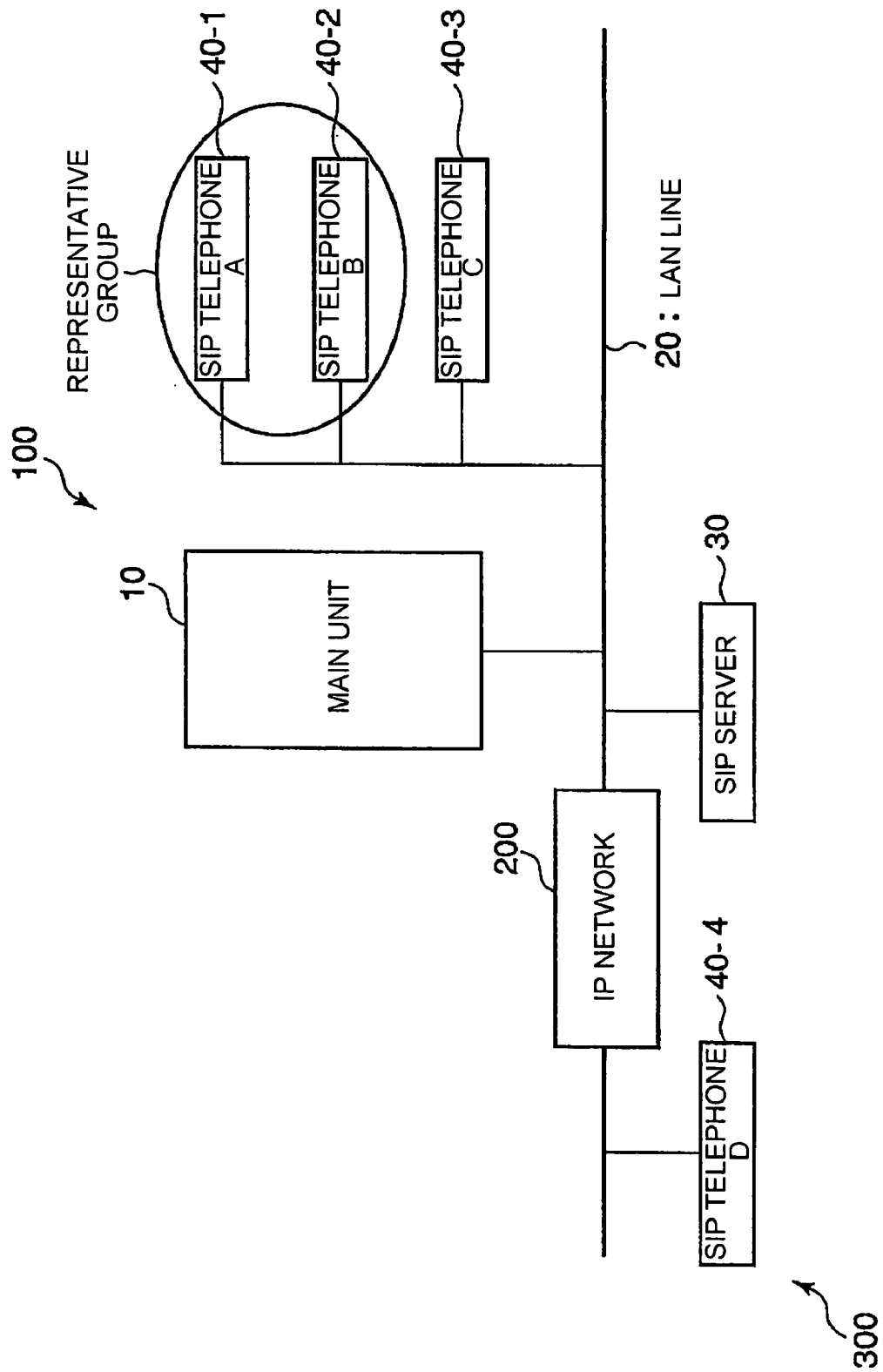
FIG. 1 is a block diagram of a key telephone system to which a method according to this invention is applicable.

Referring to FIG. 1, description will be made of a key telephone system 100 according to one embodiment of this invention. The key telephone system 100 illustrated in the figure adopts the VoIP (Voice over Internet Protocol) technique. The key telephone system 100 comprises a main unit 10, a SIP (Session Initiation Protocol) server 30 as a VoIP server, and a plurality of SIP telephones 40-1, 40-2, and 40-3.

In the example illustrated in the figure, the key telephone system 100 comprises the three SIP telephones 40-1 to 40-3. However, the number of the SIP telephones is not limited to three, as will readily be understood. Herein, the three SIP telephones 40-1 to 40-3 are called first through third SIP telephones, respectively, for the purpose of individual identification. In FIG. 1, the first through the third SIP telephones 40-1 to 40-3 are shown as a SIP telephone A, a SIP telephone B, and a SIP telephone C, respectively. In case where no individual identification is necessary, these SIP telephones may simply be depicted by 40 without the suffixes.

In the illustrated example, the first SIP telephone 40-1 (SIP telephone A) and the second SIP telephone 40-2 (SIP telephone B) form a representative group.

As illustrated in FIG. 1, the main unit 10, the SIP server 30, and the first through the third SIP telephones 40-1 to 40-3 are connected to a LAN (Local Area Network) line 20.

Figure 4:
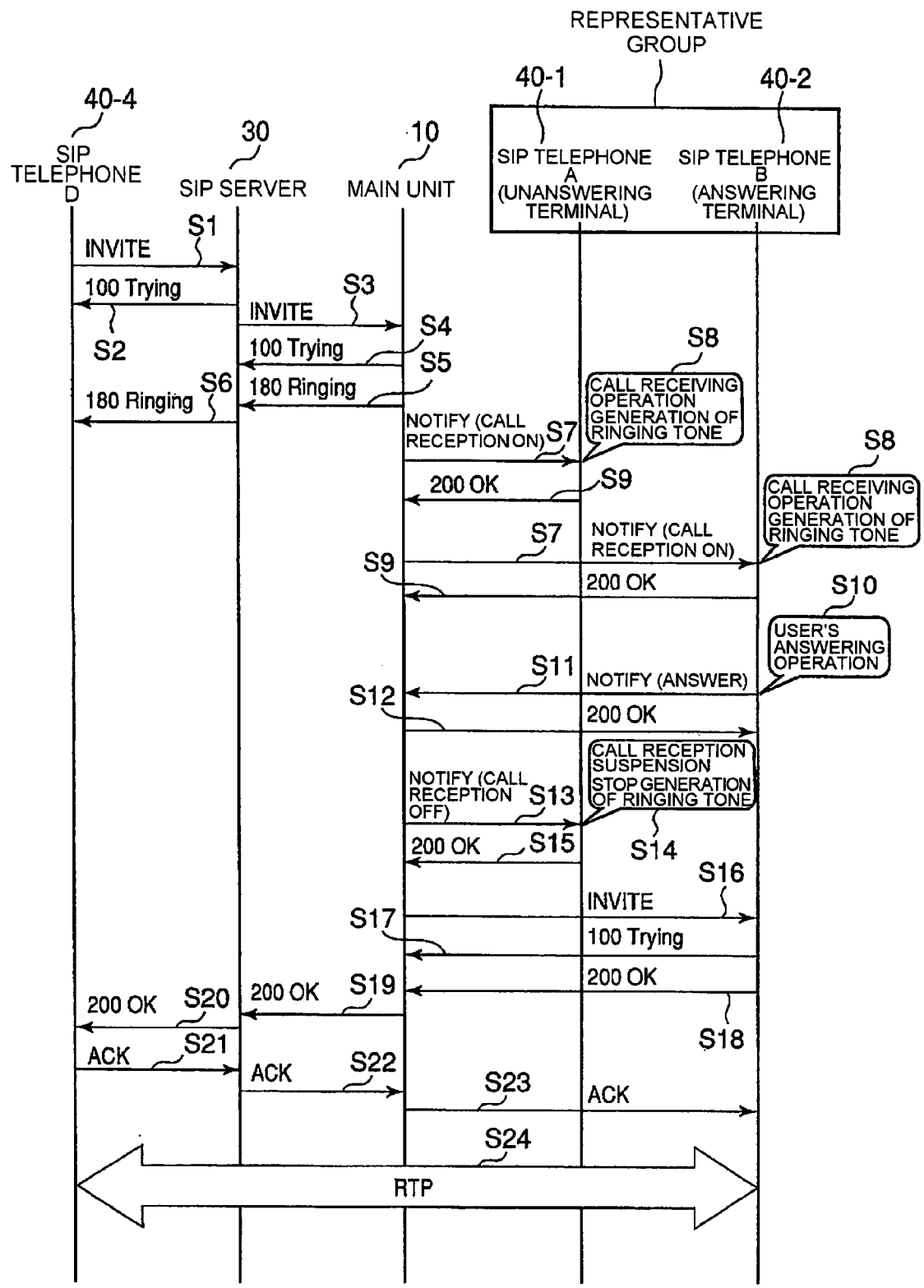
FIG. 4 is a sequence chart for describing an operation of the method according to one embodiment of this invention.

The key telephone system 100 is connected via an IP (Internet Protocol) network 200 to, for example, a different key telephone system 300. The different key telephone system 300 comprises a fourth SIP telephone 40-4. In FIG. 4, the fourth SIP telephone 404 is shown as a SIP telephone D.

For example, the SIP server 30 individually or integrally has functions as a proxy server, a re-direct server, a registrar, and a location server defined by SIP. The SIP server 30 is equipped with a SIP processing application for realizing the above-mentioned functions.

For example, each of the SIP telephones 40 has a function as a user agent (UA) defined by SIP. Each of the SIP telephones 40 is equipped with a SIP processing application for realizing the function as the user agent (UA).

Figure 2:
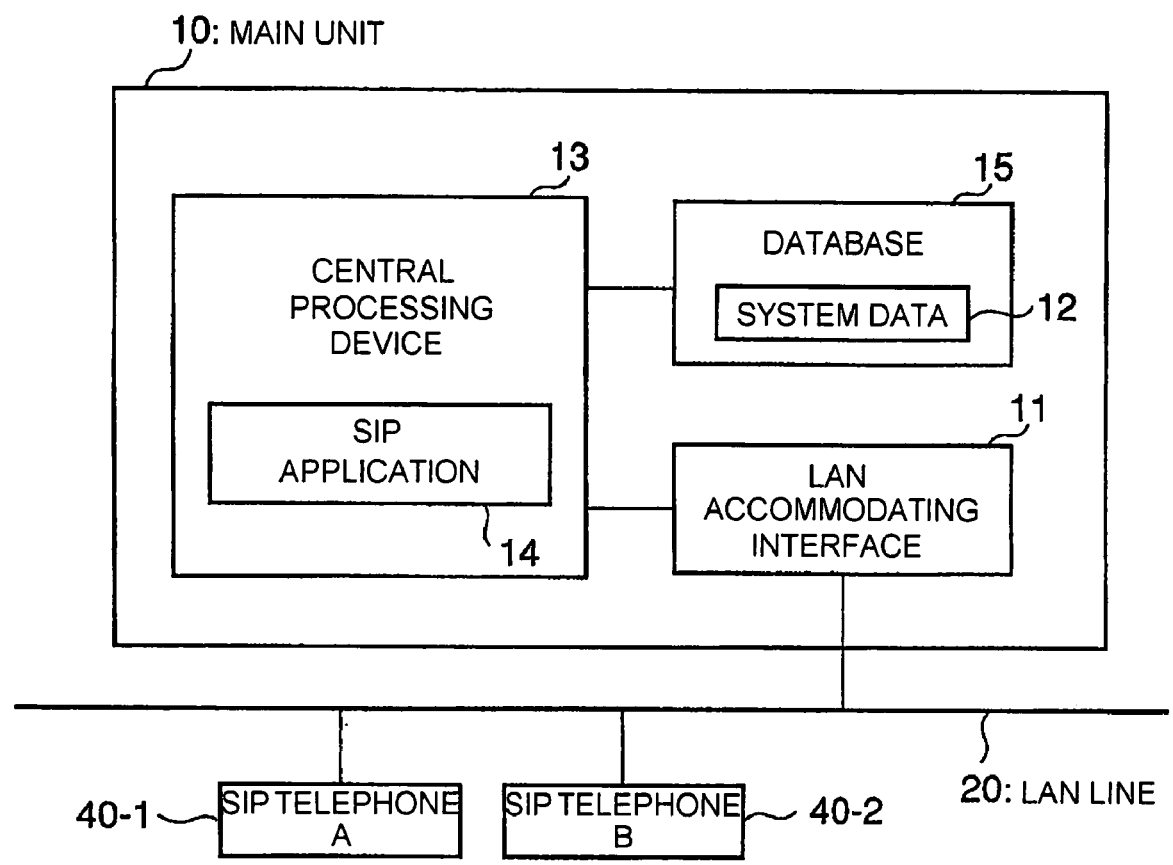
FIG. 2 is a block diagram of a main unit of the key telephone system illustrated in FIG. 1.

Referring to FIG. 2, the main unit 10 will be described. The main unit 10 comprises, for example, a LAN accommodating interface 11 accommodating the LAN line 20 and a database 15 storing system data 12. The LAN accommodating interface 11 and the database 15 are controlled by a central processing device 13.

Although not illustrated in the figure, the central processing device 13 comprises a CPU for reading, decoding, and executing an instruction or command according to a predetermined control program, a memory storing the control program and control data, a timer, and so on. The memory comprises a ROM or a RAM. As the control program, a SIP application 14 for SIP processing is equipped. The SIP application 14 includes a control program for making the main unit 10 function as a user agent (UA) like the SIP telephones 40.

The database 15 sets and stores, as the system data 12, information of the SIP telephones 40 associated with the representative group.

Next referring to FIGS. 3 and 4 in addition to FIGS. 1 and 2, reception of an incoming call for the representative group will be described. This is a procedure in which the main unit 10 detects an incoming call addressed to a number assigned to the representative group and simultaneously calls all of the SIP telephones 40 forming the representative group.

In this embodiment, as a method of calling the SIP telephones 40 upon reception of an incoming call for the representative group, a "NOTIFY" message as event notification is used without using an "INVITE" message which is a session initiation request. This is because, upon occurrence of a plurality of incoming calls for the representative group, it is unnecessary to administrate a plurality of dialogs (calls) by receiving a plurality of "INVITE" messages.

In order to transmit the "NOTIFY" message, a subscribe signal is periodically transmitted between the main unit 10 and the SIP telephones 40 to start subscription.

Figure 3:
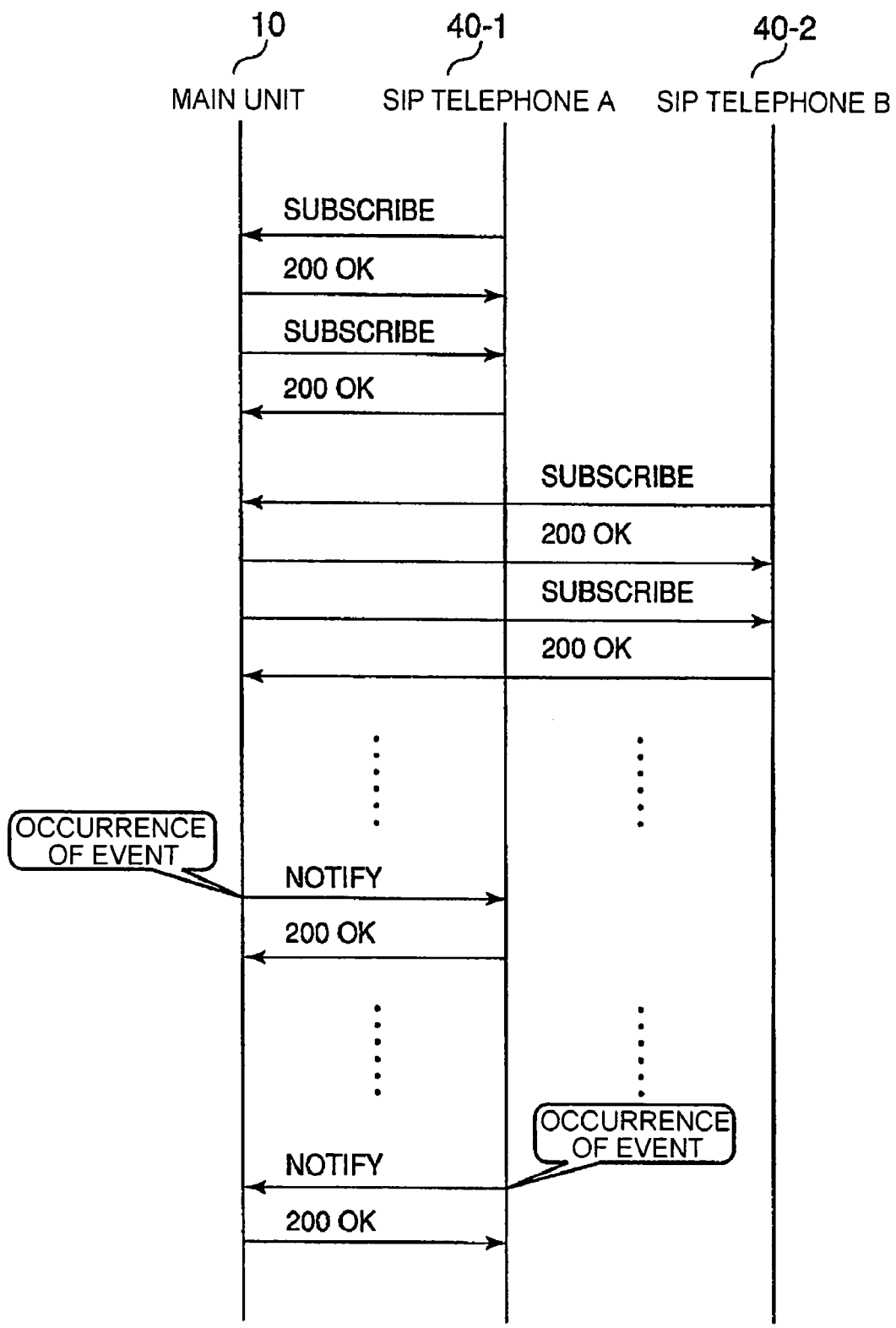
FIG. 3 is a sequence chart for describing start of subscription between a SIP telephone and the main unit.

Referring to FIG. 3, start of subscription between the SIP telephones 40 and the main unit 10 will be described.

Each of the SIP telephones 40 transmits a "SUBSCRIBE" message to the main unit 10. Responsive to the "SUBSCRIBE" message, the main unit 10 transmits a "200 OK" message to each SIP telephone 40 as an answer to the "SUBSCRIBE" message. Upon occurrence of an event (detection of an incoming call addressed to the representative group), the main unit 10 transmits the "NOTIFY" message to each SIP telephone 40 to notify the event.

The main unit 10 transmits a "SUBSCRIBE" message to each SIP telephone 40. Responsive to the "SUBSCRIBE" message, each SIP telephone 40 transmits a "200 OK" message to the main unit 10 as an answer to the "SUBSCRIBE" message. Upon occurrence of an event (user's answering operation), each SIP telephone 40 transmits a "NOTIFY" message to the main unit 10 to notify the event.

Referring to FIG. 4, a calling operation to the representative group will be described. In the illustrated example, it is assumed that the fourth SIP telephone 404 (SIP telephone D) of the different key telephone system 300 is a calling telephone while the first SIP telephone 40-1 (SIP telephone A) is an unanswering terminal and the second SIP telephone 40-2 (SIP telephone B) is an answering terminal.

At first, the calling telephone 40-4 (SIP telephone D) as a caller originates a call addressed to the representative group. In order to request session establishment, the calling telephone 40-4 (SIP telephone D) transmits an "INVITE" message to the SIP server 30 (step S1). Responsive to the "INVITE" message, the SIP server 30 transmits a "100 Trying" message to the calling telephone 40-4 (SIP telephone D) in order to notify reception of the "INVITE" message (step S2) and transfers the "INVITE" message to the main unit 10 (step S3).

Responsive to the "INVITE" message, the main unit 10 transmits a "100 Trying" message to the SIP server 30 in order to notify reception of the "INVITE" message (step S4) and transmits a "180 Ringing" message to the SIP server 30 in order to notify that a calling operation is being carried out (step S5).

Responsive to the "180 Ringing" message, the SIP server 30 transfers the "180 Ringing" message to the calling telephone 40-4 (SIP telephone D) (step S6).

Next, description will be made of reception of the incoming call addressed to the representative group. Responsive to the "INVITE" message, the main unit 10 judges, from the content of the "INVITE" message, that an incoming call is addressed to the representative group. In this case, the main unit 10 transmits a "NOTIFY" message to the SIP telephone A (first SIP telephone 40-1) and the SIP telephone B (second SIP telephone 40-2) as the SIP telephones forming the representative group (step S7). The "NOTIFY" message contains information indicative of occurrence of reception of the incoming call addressed to the representative group. The "NOTIFY" message serves as a first predetermined message. Thus, upon reception of the incoming call addressed to the representative group, the main unit 10 transmits the first predetermined message to all of the SIP telephones 40-1 and 40-2 forming the representative group to carry out the calling operation.

Responsive to the "NOTIFY" message, the SIP telephone A (first SIP telephone 40-1) and the SIP telephone B (second SIP telephone 40-2) generate a ringing tone to notify a user that he is being called (step S8). Then, the SIP telephone A (first SIP telephone 40-1) and the SIP telephone B (second SIP telephone 40-2) transmit a "200 OK" message to the main unit 10 as an answer to the "NOTIFY" message (step S9).

Next, description will be made of an answering operation to the incoming call addressed to the representative group. It is assumed here that, upon reception of the incoming call addressed to the representative group, the SIP telephone B (second SIP telephone 40-2) answers (step S10). In this case, the SIP telephone B (second SIP telephone 40-2) transmits a "NOTIFY" message to the main unit 10 (step S11). The "NOTIFY" message contains information indicative of occurrence of a user's answering operation. The "NOTIFY" message serves as a second predetermined message. Thus, the SIP telephone (second SIP telephone 40-2 in the illustrated example) answering the calling operation transmits the second predetermined message to the main unit 10 to notify the main unit 10 of the answering operation.

Responsive to the "NOTIFY" message, the main unit 10 transmits a "200 OK" message to the SIP telephone B (second SIP telephone 40-2) as an answering terminal (step S12). The call answering message "200 OK" serves as a third predetermined message. Thus, the main unit 10 transmits the third predetermined message to the answering SIP telephone (second SIP telephone 40-2 in the illustrated example) alone to establish a call session with the calling telephone (SIP telephone 40-4) as will later be described.

Further, the main unit 10 transmits a "NOTIFY" message to the SIP telephone A (first SIP telephone 40-1) as an unanswering terminal (step S13). The "NOTIFY" message contains information indicative of the fact that a particular terminal (SIP telephone B in the illustrated example) answers the incoming call addressed to the representative group. The "NOTIFY" message serves as a fourth predetermined message. Thus, the main unit 10 transmits the fourth predetermined message to the unanswering SIP telephone (first SIP telephone 40-1 in the illustrated example) to notify that the incoming call addressed to the representative group has been answered.

Responsive to the "NOTIFY" message, the SIP telephone A (first SIP telephone 40-1) suspends a call receiving operation, for example, stops generation of a ringing tone (step S14) and, simultaneously, transmits a "200 OK" message to the main unit 10 as an answer to the "NOTIFY" message (step S15).

Next, the main unit 10 transmits an "INVITE" message to the SIP telephone B (second SIP telephone 40-2) as an answering terminal in order to request session establishment (step S16).

Responsive to the "INVITE" message, the SIP telephone B (second SIP telephone 40-2) transmits a "100 Trying" message to the main unit 10 in order to notify reception of the "INVITE" message (step S17). The SIP telephone B (second SIP telephone 40-2) transmits a "200 OK" message to the main unit 10 in order to notify that the "INVITE" message has been answered" (step S18).

Responsive to the "200 OK" message, the main unit 10 transfers the "200 OK" message to the SIP server 30 (step S19). Responsive to the "200 OK" message, the SIP server 30 transfers the "200 OK" message to the calling telephone D (fourth SIP telephone 40-4) (step S20).

Responsive to the "200 OK" message, the calling telephone D (fourth SIP telephone 40-4) transmits an "ACK" message as acknowledgment of reception of the "200 OK" message to the SIP server 30 (step S21). Responsive to the "ACK" message, the SIP server 30 transfers the "ACK" message to the main unit 10 (step S22). Responsive to the "ACK" message, the main unit 10 transfers the "ACK" message to the SIP telephone B (second SIP telephone 40-2) (step S23).

When the SIP telephone B (second SIP telephone 40-2) receives the "ACK" message, media session for telephone communication is established by RTP (real-time transport protocol) (step S24). Then, telephone communication between the SIP telephone D (fourth SIP telephone 40-4) as the calling terminal and the SIP telephone B (second SIP telephone 40-2) as the answering terminal is enabled.

As is obvious from the foregoing description, it is possible to perform, in response to the incoming call addressed to the representative group, simultaneous call reception at the SIP telephones forming the representative group and answering to the incoming call.

Reception of the incoming call is notified by the use of the "NOTIFY" message without using the "INVITE" message. Therefore, it is unnecessary to administrate a plurality of dialogs (calls) by receiving a plurality of "INVITE" messages upon occurrence of a plurality of incoming calls for the representative group.

Although this invention has been described in conjunction with the preferred embodiment thereof, this invention is not limited to the foregoing embodiment but may be modified in various manners within the scope of the appended claims. For example, in the foregoing embodiment, the "NOTIFY" message for event notification is used as the first predetermined message in order to notify the SIP telephones of reception of the incoming call for the representative group. Alternatively, the "MESSAGE" message for event notification or the "INFO" message for event notification may be used. In case where the SIP telephone is not an independent telephone but is a multifunctional telephone with a display function, generation of a ringing tone and a display of reception of an incoming call may be carried out as will readily be understood.

What is claimed is:

1. A method of receiving and answering an incoming call for a representative group in a key telephone system using a session initiation protocol (SIP), the key telephone system comprising a main unit, a plurality of SIP telephones connected to the main unit via a LAN line, and a SIP server connected to the main unit via the LAN line, at least two of the SIP telephones forming the representative group, wherein the method comprising:

a first transmitting step at which the main unit transmits, upon reception of the incoming call for the representative group, a first predetermined message to all of the SIP telephones forming the representative group to perform a calling operation;

a second transmitting step at which a particular one of the SIP telephones, which answers the calling operation as an answering SIP telephone, transmits a second predetermined message to the main unit to notify the main unit that the calling operation is answered;

a third transmitting step at which the main unit transmits a third predetermined message to the answering SIP telephone alone without via the SIP server to establish a call session with a calling telephone; and a fourth transmitting step at which the main unit transmits a fourth predetermined message to an unanswering SIP telephone to notify that the incoming call for the representative group has been answered;

wherein the first predetermined message is selected from a group consisting of a "NOTIFY" message for event notification, a "MESSAGE" message for event notification, and an "INFO" message for event notification, and wherein the third predetermined message is an "INVITE" message for requesting session establishment.

2. The method as claimed in claim 1, further comprising a notifying step at which each of the SIP telephones, which have received the first predetermined message, notifies reception of the incoming call to a user.

3. The method as claimed in claim 2, further comprising a suspending step in which the unanswering SIP telephone, which has received the fourth predetermined message, suspends a call receiving operation to stop notifying the reception of the incoming call to the user.

4. The method as claimed in claim 1, wherein the second predetermined message is a "NOTIFY" message.

5. The method as claimed in claim 1, wherein the fourth predetermined message is a "NOTIFY" message.

6. A key telephone system using a session initiation protocol (SIP), the key telephone system comprising a main unit, a plurality of SIP telephones connected to the main unit via a LAN line, and a SIP server connected to the main unit via the LAN line, at least two of the SIP telephones forming a representative group, wherein:
the main unit comprises first transmitting means for transmitting, upon reception of an incoming call for the representative group, a first predetermined message to all of the SIP telephones forming the representative group to perform a calling operation;
a particular one of the SIP telephones, which answers the calling operation as an answering SIP telephone, comprising second transmitting means for transmitting a second predetermined message to the main unit to notify the main unit that the calling operation is answered;
the main unit comprising third transmitting means for transmitting a third predetermined message to the answering SIP telephone alone without via the SIP server to establish a call session with a calling telephone and fourth transmitting means for transmitting a fourth predetermined message to an unanswering SIP telephone to notify that the incoming call for the representative group has been answered;
wherein the first predetermined message is selected from a group consisting of a "NOTIFY" message for event notification, a "MESSAGE" message for event notification, and an "INFO" message for event notification, and
wherein the third predetermined message is an "INVITE" message for requesting session establishment.

7. The key telephone system as claimed in claim 6, wherein each of the SIP telephones, which have received the first predetermined message, comprises notifying means for notifying reception of the incoming call to a user.

8. The key telephone system as claimed in claim 7, wherein the unanswering SIP telephone, which has received the fourth predetermined message, comprises suspending means for suspending a call receiving operation to stop notifying the reception of the incoming call to the user.

9. The key telephone system as claimed in claim 6, wherein the second predetermined message is a "NOTIFY" message.

10. The key telephone system as claimed in claim 6, wherein the fourth predetermined message is a "NOTIFY" message.

11. A main unit for use in a key telephone system using a session initiation protocol (SIP), the key telephone system comprising the main unit, a plurality of SIP telephones connected to the main unit via a LAN line, and a SIP server connected to the main unit via the LAN line, at least two of the SIP telephones forming a representative group, wherein the main unit comprises:

transmitting means for transmitting, upon reception of an incoming call for the representative group, a first predetermined message to all of the SIP telephones forming the representative group to perform a calling operation;
receiving means for receiving, from a particular one of the SIP telephones which answers the calling operation as an answering SIP telephone, a second predetermined message for notifying the main unit that the calling operation is answered;
transmitting means for transmitting a third predetermined message to the answering SIP telephone alone without via the SIP server to establish a call session with a calling telephone; and
transmitting means for transmitting a fourth predetermined message to an unanswering SIP telephone to notify that the incoming call for the representative group has been answered;
wherein the first predetermined message is selected from a group consisting of a "NOTIFY" message for event notification, a "MESSAGE" message for event notification, and an "INFO" message for event notification, and
wherein the third predetermined message is an "INVITE" message for requesting session establishment.

12. The main unit as claimed in claim 11, wherein the second predetermined message is a "NOTIFY" message.

13. The key telephone system as claimed in claim 11, wherein the fourth predetermined message is a "NOTIFY" message.

14. A non-transitory computer readable recording medium storing a program performed by a computer of a main unit of a key telephone system using a session initiation protocol (SIP), the key telephone system comprising the main unit, a plurality of SIP telephones connected to the main unit via a LAN line, and a SIP server connected to the main unit via the LAN line, at least two of the SIP telephones forming a representative group, wherein the program makes the main unit function as:
means for transmitting, upon reception of an incoming call for the representative group, a first predetermined message to all of the SIP telephones forming the representative group to perform a calling operation;
means for receiving, from a particular one of the SIP telephones which answers the calling operation as an answering SIP telephone, a second predetermined message for notifying the main unit that the calling operation is answered;
means for transmitting a third predetermined message to the answering SIP telephone alone without via the SIP server to establish a call session with a calling telephone; and
means for transmitting a fourth predetermined message to an unanswering SIP telephone to notify that the incoming call for the representative group has been answered;
wherein the first predetermined message is selected from a group consisting of a "NOTIFY" message for event notification, a "MESSAGE" message for event notification, and an "INFO" message for event notification, and
wherein the third predetermined message is an "INVITE" message for requesting session establishment.

15. The non-transitory computer readable recording medium as claimed in claim 14, wherein the second predetermined message is a "NOTIFY" message.

16. The non-transitory computer readable recording medium as claimed in claim 14, wherein the fourth predetermined message is a "NOTIFY" message.

* * * * *